United States Patent [19]
Freund et al.

[11] Patent Number: 5,938,211
[45] Date of Patent: Aug. 17, 1999

[54] ALIGNMENT LEDGE FOR AUTOMATIC AND REPEATABLE THETA REGISTRATION OF LASER BARS

[75] Inventors: Joseph Michael Freund, Fogelsville; George John Przybylek, Douglasville; Dennis Mark Romero, Allentown, all of Pa.

[73] Assignee: Lucent Technologies Inc., Murray Hill, N.J.

[21] Appl. No.: 09/131,739

[22] Filed: Aug. 10, 1998

[51] Int. Cl.[6] ........................................... B23B 5/22
[52] U.S. Cl. ..................... 279/3; 269/21; 269/58; 279/156; 294/64.1
[58] Field of Search ................ 269/21, 58, 317; 279/3, 133, 156; 294/64.1

[56] References Cited

U.S. PATENT DOCUMENTS

| | | | |
|---|---|---|---|
| 4,389,064 | 6/1983 | Laverriere | 294/64.1 |
| 4,603,867 | 8/1986 | Babb et al. | 279/3 |
| 5,375,895 | 12/1994 | Volkert | 294/64.1 |

FOREIGN PATENT DOCUMENTS

| | | | |
|---|---|---|---|
| 57-16305 | 10/1982 | Japan | 279/3 |
| 2164018 | 3/1986 | United Kingdom | 294/64.1 |

*Primary Examiner*—Andrea L. Pitts
*Assistant Examiner*—Monica Smith

[57] ABSTRACT

A system for positioning an article at a predetermined angular orientation with respect to a vacuum collet comprising a vacuum collet having an article pickup surface; and an alignment ledge overhanging the pickup surface, wherein the alignment ledge is at a predetermined angular orientation with respect to the vacuum collet.

35 Claims, 3 Drawing Sheets

ALIGNMENT LEDGE FOR AUTOMATIC AND REPEATABLE THETA REGISTRATION OF LASER BARS

FIELD OF THE INVENTION

This invention relates to a system for automatically aligning laser bars, and, in particular, to a system for automatic and repeatable theta registration of the laser bars.

BACKGROUND OF THE INVENTION

Laser bars are often manufactured using an assembly line type manufacturing process. It is often necessary to invert, move or reposition the laser bars during the manufacture process to permit the machinery to access more than one side of the laser bar, or, for transferring the laser bars to a film hoop or pack, or other piece of machinery or storage compartment or the like after manufacturing. In the prior art, the laser bars proceed along the assembly line in a fixture blade or facet coat fixture with the laser bars standing on one edge. The prior art system for inverting and moving the laser bars generally includes a vacuum collet which is positioned over the laser bar slightly off-center from the laser bar. The vacuum collet is lowered towards the laser bar and, due to the off-center suction effect through the vacuum collet, the vacuum collet picks the bar off a support surface, inverts it 90 degrees and suctionaly maintains the laser bar to the vacuum collet. The vacuum collet, and laser bar attached thereto, is then moved to a different location for transferring the laser bar to a film hoop or pack for further processing, storage or the like. One of skill in the art will recognize that the laser bar needs to be transferred to the film hoop at a precise angular orientation, or theta registration. That is, the manufacturing process requires that the laser bar be transferred to the film hoop at a precise orientation, within the limits of art recognized tolerance levels. In the prior art, the theta registration of the laser bar as it is picked up by the vacuum collet is imprecise and needs to be monitored and controlled by the use of complicated vision software and robotics.

SUMMARY OF THE INVENTION

The present invention is directed to a vacuum collet having an alignment ledge for easy and accurate theta registration of the laser bars. In particular, the present invention is directed to a vacuum collet having an alignment ledge for providing automatic and repeatable theta registration of laser bars during the loading and unloading sequence. The system generally includes an alignment ledge which is attached to a standard bar pickup vacuum collet using a linear bearing or the like. The alignment ledge overhangs the collet pickup surface by about the thickness of the laser bar, and is movable along a linear bearing in a vertical direction. In a preferred embodiment, the angular orientation, or theta, between the alignment ledge and the vacuum collet is 0 degrees. However, one of skill in the art will recognize that the theta can be any preset or predetermined angular orientation, as a matter of design choice, without departing from the spirit of the invention.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

DESCRIPTION OF THE DRAWING FIGURES

In the drawing figures, which are not to scale, and which are merely illustrative, and wherein like reference numerals depict like elements throughout the several views.

DETAILED DESCRIPTION OF THE PREFERRED EMBODIMENTS

The present invention is directed to a vacuum collet having an alignment ledge for easy and accurate theta registration of the laser bars. In particular, the present invention is directed to a vacuum collet having an alignment ledge for providing automatic and repeatable theta registration of laser bars during the loading and unloading sequence.

Figure 7:
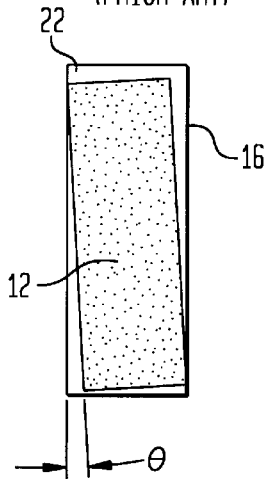
FIG. 7 is a bottom detail view depicting a vacuum collet in accordance with the prior art with a laser bar attached thereto.

As seen in FIG. 7, the prior art system for inverting and moving a laser bar 12 generally includes a vacuum collet 16 which is positioned over laser bar 12 slightly off-center from the laser bar. Vacuum collet 16 is lowered towards laser bar and, due to the off-center suction effect through the vacuum collet 16, vacuum collet 16 picks laser bar 12 off a support surface, inverts it 90 degrees and suctionaly maintains laser bar 12 to collet pickup surface 22. As seen in FIG. 7, the laser bar 12 is at an angle theta ($\Theta$) with respect to vacuum collet 16. One of skill in the art will recognize that $\Theta$ of the prior art system is not automatic or repeatable, and therefore needs to be monitored and controlled by the use of complicated vision software and robotics.

Figure 3:
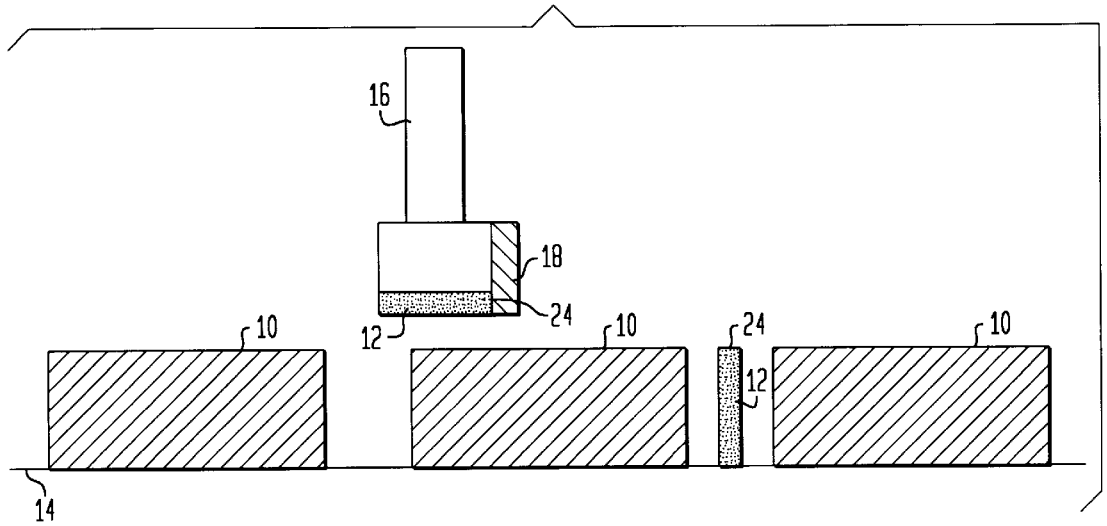
Figure 4:
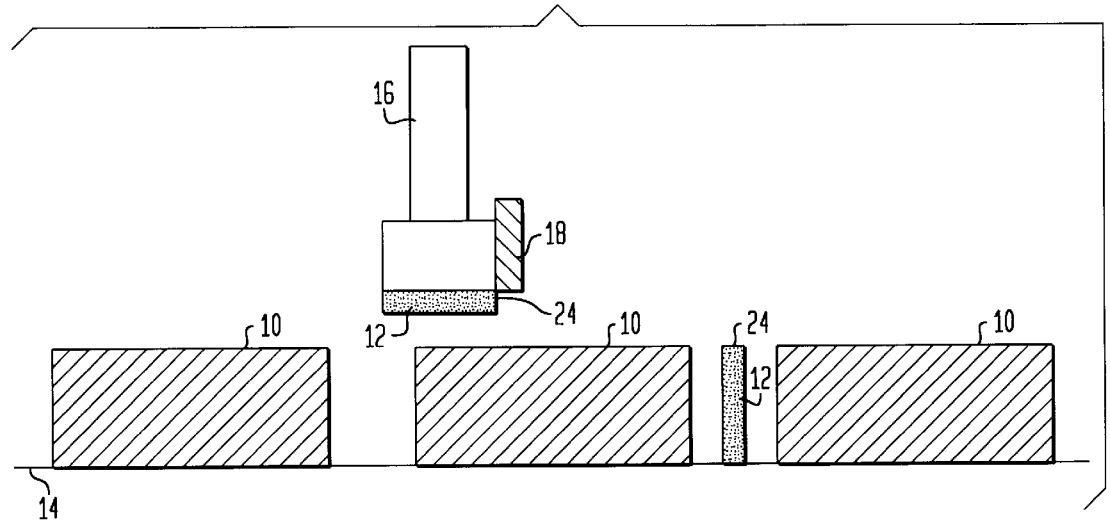
Figure 5:
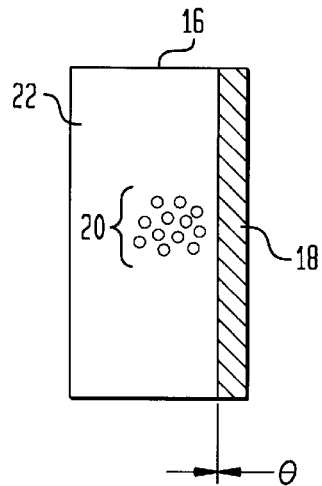
FIG. 5 is a bottom detail view depicting an exemplary layout of the alignment ledge and vacuum collet without a laser bar attached thereto.
Figure 6:
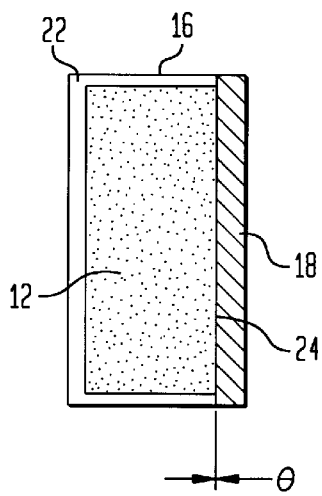
FIG. 6 is a bottom detail view depicting an exemplary layout of the alignment ledge and vacuum collet with a laser bar attached thereto.

As seen in FIGS. 1–6, the system of the present invention generally includes an alignment ledge 18 which is attached to a standard bar pickup vacuum collet 16 using a linear bearing or the like (not shown). The alignment ledge 18 overhangs the collet pickup surface 22 of vacuum collet 16 by about the thickness of the laser bar 12, and is movable along a linear bearing (not shown) in a vertical direction. In a preferred embodiment, as best seen in FIGS. 5 and 6, the angular orientation, or theta ($\Theta$), between the alignment ledge and the vacuum collet is 0 degrees, however, one of skill in the art will recognize that $\Theta$ can be any preset or predetermined angular orientation, as a matter of design choice, without departing from the spirit of the invention.

Figure 1:
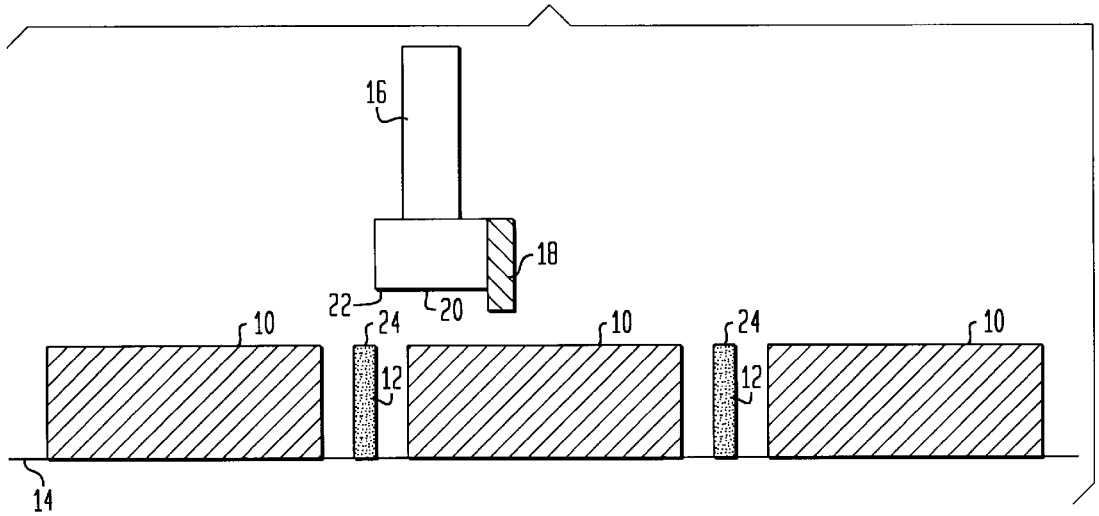
FIGS. 1 through 4 are side elevational views of the alignment ledge and vacuum collet system constructed in accordance with a preferred embodiment of the present invention with the ledge, collet and laser bars shown in exemplary positions as the laser bar is picked up from a surface and self aligns in theta to the alignment ledge.
Figure 2:
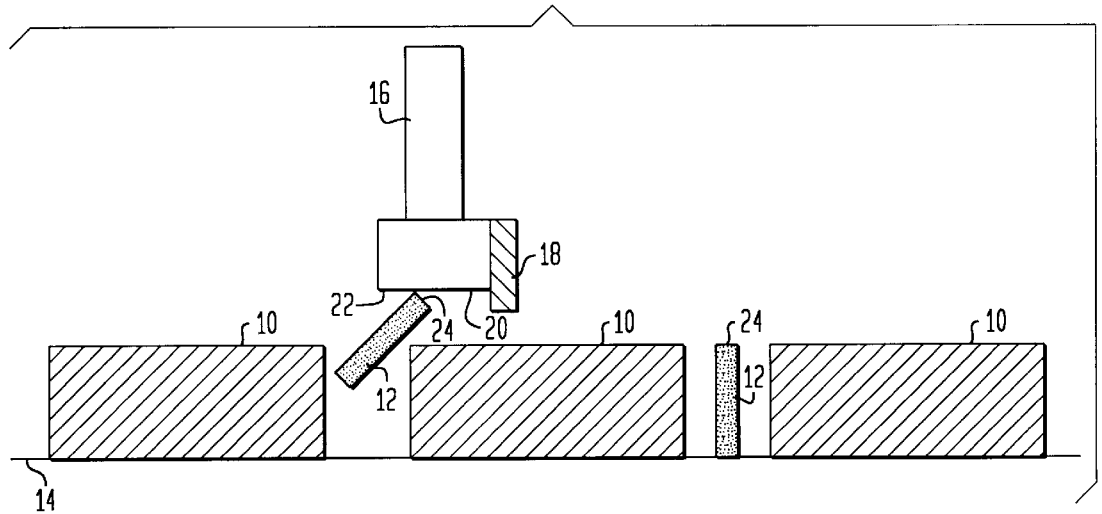

As seen in FIGS. 1–3, laser bars 12 proceed along an assembly line in a facet coat-type fixture 10. Vacuum collet 16 is positioned over a laser bar 12 and uses a vacuum communicated through corresponding vacuum holes 20 (FIG. 5) to pick up laser bar 12 from a support surface 14. Vacuum collet 16 is positioned over laser bar 12 such that vacuum holes 20 are not directly over the center of laser bar 12, but instead are off-center from laser bar 12. The suction effect through the off-center vacuum holes 20 causes laser bar 12 to be lifted off support surface 14, rotate 90 degrees to a substantially horizontal position and be suctionaly maintained to collet pickup surface 22. One of skill in the art will recognize that the interaction of alignment ledge 18 and the vacuum communicated through corresponding vacuum holes 20 aids in lifting and rotating laser bar 12.

As seen in FIGS. 2 and 3, as laser bar 12 is lifted upwards and rotated towards collet pickup surface 22, the leading edge 24 of laser bar 12 contacts alignment ledge 18 as the laser bar 12 is in its loaded position. In a preferred embodiment, as seen in FIGS. 5 and 6, Θ is preset to 0 degrees. Accordingly, laser bar 12 is automatically positioned to a preset angular orientation Θ with respect to the vacuum collet 16. Laser bar 12 can then be transferred to a film hoop (not shown) without having to adjust the angular orientation Θ. Also, as seen in FIG. 4, alignment ledge 18 is movable in a vertical direction when transferring or depositing laser bar 12 to the film hoop or pack (not shown).

One of skill in the art will recognize that Θ could be at any preset angle with respect to vacuum collet 16 by merely adjusting the angular orientation between alignment ledge 18 and vacuum collet 16. Also, one of skill in the art will recognize that the system of the present invention will work equally well with any shaped laser bar so long as the alignment ledge is shaped to correspond to a leading edge of the laser bar. Also, one of skill in the art will recognize that the alignment ledge could be constructed to be movable in any given direction, or made rotable, pivotable or the like, as a matter of design choice.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A system for positioning an article at a predetermined angular orientation with respect to a vacuum collet comprising:
    a vacuum collet having an article pickup surface; and
    an alignment ledge overhanging said pickup surface at an outer peripheral edge thereof, said alignment ledge being at a predetermined angular orientation to said vacuum collet.

2. The system according to claim 1, wherein said alignment ledge is movably attached to said vacuum collet.

3. The system according to claim 1, wherein said article pickup surface is shaped and sized so as to pickup a laser bar.

4. The system according to claim 1, wherein said alignment ledge overhangs said pickup surface by a distance substantially equal to the width of said article.

5. The system according to claim 1, wherein said vacuum collet is a standard bar pickup vacuum collet.

6. A method of positioning an aticle at a predetemined angular orientation with respect to a vacuum collet comprising the steps of:
    (a) initiating a vacuum induced suction through an article pickup surface in a vacuum collet in an amount sufficient to lift an article from a support surface underlying said vacuum collet;
    (b) lifting said article from said support surface with said vacuum collet such that an edge of said article contacts an alignment ledge, said alignment lodge attached to said vacuum collet and overhanig said article pickup surface at an outer peripheral edge thereof at a predetermined angular orientation to said vacuum collet.

7. The method according to claim 6, wherein said vacuum induced suction rotates said article about 90 degrees as said article is lifted from said support surface to said article pickup surface.

8. The method according to claim 6, wherein said steps (b) is performed using an alignment ledge movably attached to said vacuum collet.

9. The method according to claim 6, wherein said steps (a) and (b) are perforned using an article pickup surface shaped and sized so as to pick up a laser bar.

10. The method according to claim 6, wherein said step (b) is performed using an alignment ledge which overhangs said pickup surface by a distance substantially equal to the width of said article.

11. The method according to claim 6, wherein said steps (a) and (b) are performed using a standard bar pickup vacuum collet.

12. A system for positioning an article at a predetermined angular orientation with respect to a vacuum collet comprising:
    a vacuum collet having an article pickup surface; and
    an alignment ledge movably attached to and overhanging said pickup surface, said alignment ledge being at a predetermined angular orientation to said vacuum collet.

13. The system according to claim 12, wherein said article pickup surface is shaped and sized so as to pickup a laser bar.

14. The system according to claim 12, wherein said alignment ledge overhangs said pickup surface by a distance substantially equal to the width of said article.

15. The system according to claim 12, wherein said vacuum collet is a standard bar pickup vacuum collet.

16. A system for positioning an article at a predetermined angular orientation with respect to a vacuum collet comprising:
    a vacuum collet having an article pickup surface; and
    an alignment ledge movably attached to and overhanging said pickup surface, said alignment ledge being at a predetermined angular orientation to said vacuum collet;
    said pickup surface and said alignment ledge being separately formed.

17. The system according to claim 16, wherein said article pickup surface is shaped and sized so as to pickup a laser bar.

18. The system according to claim 16, wherein said alignment ledge overhangs said pickup surface by a distance substantially equal to the width of said article.

19. The system according to claim 16, wherein said vacuum collet is a standard bar pickup vacuum collet.

20. A method of positioning an article at a predetermined angular orientation with respect to a vacuum collet comprising the steps of:
    (a) initiating a vacuum induced suction through an article pickup surface in a vacuum collet in an amount sufficient to lift an article from a support surface underlying said vacuum collet;
    (b) lifting said article from said support surface with said vacuum collet such that an edge of said article contacts an alignment ledge movably attached to said vacuum collet and overhanging said article pickup surface at a predetermined angular orientation to said vacuumn collet.

21. The method according to claim 20, wherein said vacuum induced suction rotates said article about 90 degrees as said article is lifted from said support surface to said article pickup surface.

22. The method according to claim 20, wherein said steps (a) and (b) are performed using an article pickup surface shaped and sized so as to pick up a laser bar.

23. The method according to claim 20, wherein said step (b) is performed using an alignment ledge which overhangs said pickup surface by a distance substantially equal to the width of said article.

24. The method according to claim 20, wherein said steps (a) and (b) are performed using a standard bar pickup vacuum collet.

25. A method of positioning an article at a predetermined angular orientation with respect to a vacuum collet comprising the steps of:

(a) initiating a vacuum induced suction through an article pickup surface in a vacuum collet in an amount sufficient to Lift an article from a support surface underlying said vacuum collet;

(b) lifting said article from said support surface with said vacuum collet such that an edge of said article contacts a separately formed alignment ledge attached to said vacuum collet and overhanging said article pickup surface at a predetermined angular orientation to said vacuum collet.

26. The method according to claim 25, wherein said vacuum induced suction rotates said article about 90 degrees as said article is lifted from said support surface to said article pickup surface.

27. The method according to claim 25, wherein said step (b) is performed using an alignment ledge movably attached to said vacuum collet.

28. The method according to claim 25, wherein said steps (a) and (b) are performed using an article pickup surface shaped and sized so as to pick up a laser bar.

29. The method according to claim 25, wherein said step (b) is performed using an alignment ledge which overhangs said pickup surface by a distance substantially equal to the width of said article.

30. The method according to claim 25, wherein said steps (a) and (b) are performed using a standard bar pickup vacuum collet.

31. A method of positioning an article at a predetermined angular orientation with respect to a vacuum collet comprising the steps of:

(a) initiating a vacuum induced suction through an article pickup surface in a vacuum collet in an amount sufficient to lift an article from a support surface underlying said vacuum collet;

(b) rotating said article about 90 degrees as said article is lifted from said support surface to said article pickup surface such that an edge of said article contacts an alignment ledge attached to said vacuum collet and overhanging said article pickup surface at a predetermined angular orientation to said vacuum collet.

32. The method according to claim 31, wherein said step (b) is performed using an alignment ledge movably attached to said vacuum collet.

33. The method according to claim 31, wherein said steps (a) and (b) are performed using an article pickup surface shaped and sized so as to pick up a laser bar.

34. The method according to claim 31, wherein said step (b) is performed using an alignment ledge which overhangs said pickup surface by a distance substantially equal to the width of said article.

35. The method according to claim 31, wherein said steps (a) and (b) are performed using a standard bar pickup vacuum collet.

* * * * *